United States Patent
Sung

(10) Patent No.: US 8,154,687 B2
(45) Date of Patent: Apr. 10, 2012

(54) LIQUID CRYSTAL DISPLAY DEVICE

(75) Inventor: Kew-Yong Sung, Gumi Si (KR)

(73) Assignee: LG. Display Co. Ltd., Seoul (KR)

( * ) Notice: Subject to any disclaimer, the term of this patent is extended or adjusted under 35 U.S.C. 154(b) by 63 days.

(21) Appl. No.: 12/334,200

(22) Filed: Dec. 12, 2008

(65) Prior Publication Data

US 2009/0167988 A1     Jul. 2, 2009

(30) Foreign Application Priority Data

Dec. 31, 2007   (KR) .................... 10-2007-0141955

(51) Int. Cl.
  *G02F 1/1333*    (2006.01)
(52) U.S. Cl. .......................................... 349/65; 362/615
(58) Field of Classification Search .................. None
  See application file for complete search history.

(56) References Cited

U.S. PATENT DOCUMENTS

| | | | | |
|---|---|---|---|---|
| 6,412,968 | B1* | 7/2002 | Ohkawa | 362/26 |
| 7,039,286 | B2* | 5/2006 | Leu et al. | 385/129 |
| 7,637,646 | B2* | 12/2009 | Byun et al. | 362/608 |
| 2004/0130883 | A1* | 7/2004 | Leu et al. | 362/31 |
| 2006/0256254 | A1* | 11/2006 | Park et al. | 349/65 |
| 2007/0064440 | A1* | 3/2007 | Liao | 362/600 |
| 2008/0002428 | A1* | 1/2008 | Byun et al. | 362/608 |
| 2008/0025686 | A1* | 1/2008 | Lee et al. | 385/146 |
| 2009/0135625 | A1* | 5/2009 | Yang et al. | 362/613 |

* cited by examiner

*Primary Examiner* — Thanh-Nhan P. Nguyen
(74) *Attorney, Agent, or Firm* — Brinks Hofer Gilson & Lione

(57) ABSTRACT

Disclosed is a liquid crystal display (LCD) device having light scattering patterns at an edge region of a light guide plate, capable of preventing a hot spot phenomenon occurring when an edge-type backlight unit is implemented with using light emitting means such as light emitting diodes (LED). The LCD device comprises: an LC panel; a light guide plate disposed below the LC panel, and having light scattering patterns formed in a plurality of groups with a constant gap therebetween at one or more edge regions on an upper surface thereof; and light emitting devices disposed at a side wall of the light guide plate, each light emitting device disposed to correspond to a region between the light scattering patterns, for emitting light.

3 Claims, 3 Drawing Sheets

LIQUID CRYSTAL DISPLAY DEVICE

RELATED APPLICATIONS

The present invention relates to subject matter contained in priority Korean Application 10-2007-0141955, filed Dec. 31, 2007, which is herein expressly incorporated by reference in its entirety.

BACKGROUND

1. Field of the Disclosure

The present invention relates to a liquid crystal display (LCD) device, and more particularly, to an LCD device having light scattering patterns at an edge region of a light guide plate, capable of preventing a hot spot phenomenon from occurring when an edge-type backlight unit is implemented by using light emitting means such as light emitting diodes (LED).

2. Description of the Background Art

Generally, an LCD device is a representative flat display device for displaying images by controlling an optical transmittance so as to correspond to image signals. However, since the LCD device is not a spontaneous light emitting device, an additional light source that provides light from a rear surface of a liquid crystal (LC) screen is required to display images.

The light source that irradiates light from a rear surface of a liquid crystal module (LCM) to a front surface is called as a backlight unit. The backlight unit includes a lamp, and integrated components for a power circuit to drive the lamp and for uniformly planarized light. The backlight unit may be largely classified into a direct type and an edge type according to a method for irradiating light. Recently, direct type and edge type of flat backlight units adopting a planar light source such as light emitting diodes (LED) are being actively researched.

Here, in the edge type backlight unit, a light source is disposed at a side surface of an LCD module, and light emitted from the light source forms planarized light through a light guide plate. Since the edge type backlight unit has a low brightness, a light guide system applied from the light source to a comparatively far distance has been required to obtain a uniform brightness. In order to minimize a loss in transmitting light to the comparatively far distance from the light source, advanced optical techniques have been demanded.

Hereinafter, the edge-type LED backlight unit will be explained with reference to the attached drawings.

FIG. 1 is an exploded perspective view showing an edge-type light emitting diode (LED) backlight unit in accordance with the conventional art, and FIG. 2 is a view showing a distributed state of light through simulation of a liquid crystal display (LCD) device of FIG. 1.

As shown in FIG. 1, the edge-type LED backlight unit comprises a light source 10 for providing light, a light guide plate 32 for guiding light provided from the light source 10, and a diffusion sheet 34 and a prism sheet 55 for enhancing an optical characteristic of light having passed through the light guide plate 32.

Here, the light source 10 is composed of a substrate 12 and a plurality of LEDs 14. The LEDs 14 are mounted on the substrate 12 in one row, and are electrically connected to an external power source. The substrate 12 having the plurality of LEDs 14 mounted thereon is insertion-fixed into a light source cover 16. A coupling groove 16a is formed at an inner surface of the light source cover 16 along a long axis direction of the light source cover 16. Accordingly, the substrate 12 is insertion-fixed into the coupling groove 16a.

The light guide plate 32 guides light provided from the LEDs 14 of the light source 10, thereby distributing light onto an entire part of an upper surface of the light guide plate 32. Here, a reflection plate 30 disposed below the light guide plate 32 serves to enhance a reflection efficiency of light.

The diffusion sheet 34 is disposed on an upper surface of the light guide plate 32, thereby uniformly distributing light having passed through the light guide plate 32.

The prism sheet 55 composed of first and second prism sheets 52 and 54 is disposed on an upper surface of the diffusion sheet 34. The prism sheet 55 serves to introduce light provided from the diffusion sheet 34 to an image region, that is, a constant region of an LC panel (not shown) that displays images.

A protection sheet 56 for protecting the prism sheet 55 from an external scratch may be disposed on the upper surface of the prism sheet 55.

The LCD device having the LED backlight unit requires a planar light source so as to display images on a screen. Light emitted from an LED packet 14 in the form of points is converted into a planar light source after passing through the light guide plate 32.

In order to reduce a loss of light provided to the LED package 14 from the light guide plate 32, a spacing distance between the LED package 14 and the light guide plate 32 has to be minimized. Here, an emission width of the LED package 14 is predetermined from its structure, and a degree of light concentration becomes weaker towards the side portions as compared to the middle portion of the LED package 14.

As a result, the light guide plate 32 (or LC panel) having the LED package 14 arranged thereon receives, from the LED package 14, relatively weak light at an edge region thereof. This may cause a specific part, 'A' to be displayed as a dark area with a semi-circular shape.

The dark area degrades appearance quality of the screen, thereby lowering the reliability of the product.

SUMMARY OF THE INVENTION

A liquid crystal display (LCD) device comprises: an LC panel; a light guide plate disposed below the LC panel, and having light scattering patterns formed in a plurality of groups at one or more edge regions on an upper surface thereof; and light emitting devices disposed at a side wall of the light guide plate, each light emitting device disposed to correspond to a region between the light scattering patterns.

BRIEF DESCRIPTION OF THE DRAWINGS

The accompanying drawings, which are included to provide a further understanding of the invention and are incorporated in and constitute a part of this specification, illustrate embodiments of the invention, and together with the description, serve to explain the principles of the invention.

In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings.

Hereinafter, an LCD device according to the present invention will be explained in more detail with reference to the attached drawings.

Figure 1:
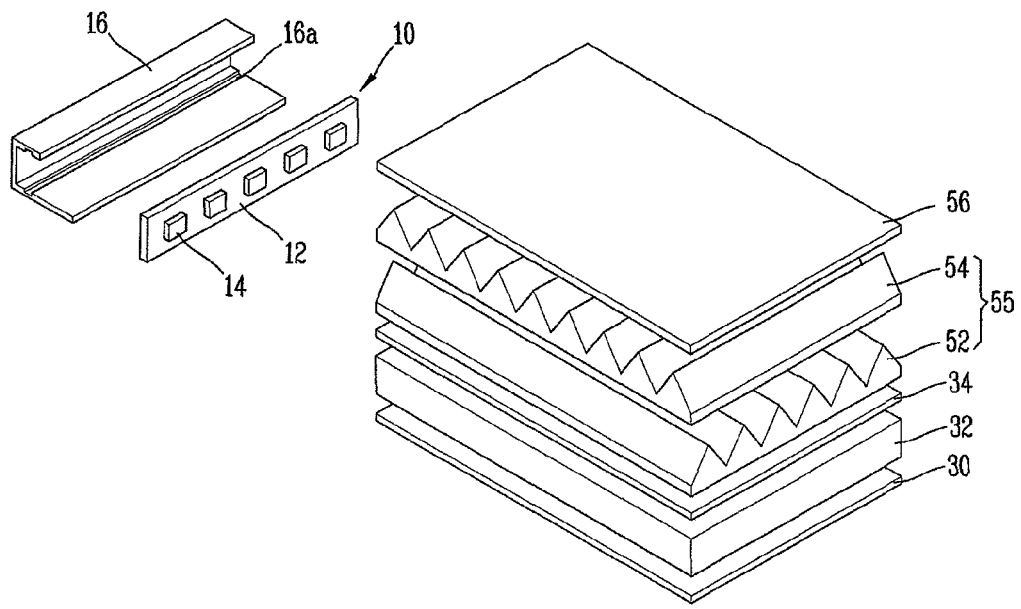
FIG. 1 is an exploded perspective view showing an edge-type light emitting diode (LED) backlight unit in accordance with the conventional art.
Figure 2:
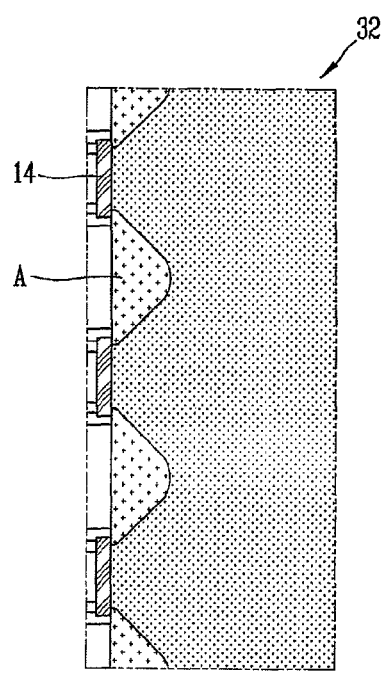
FIG. 2 is a view showing a distributed state of light through simulation of a liquid crystal display (LCD) device of FIG. 1.
Figure 3:
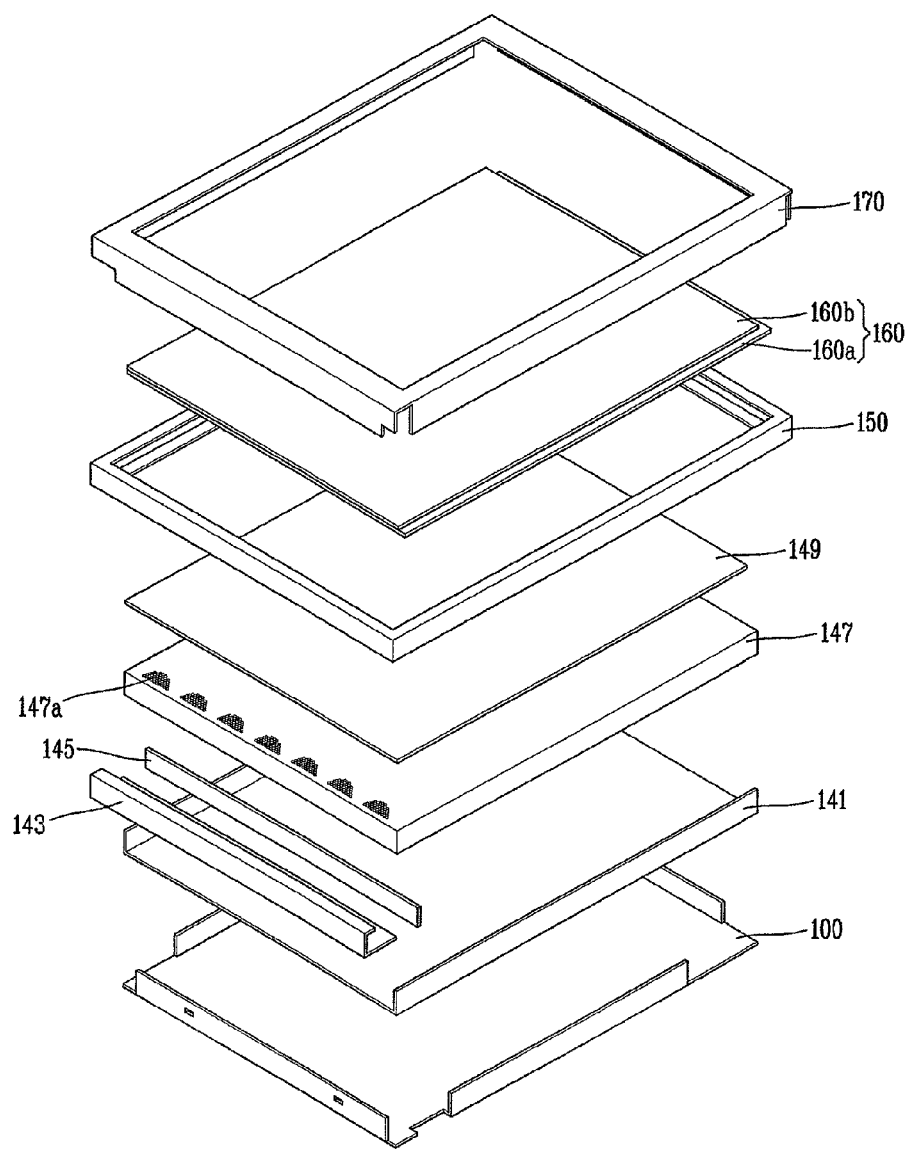
FIG. 3 is an exploded perspective view showing an LCD device according to the present invention.
Figure 4:
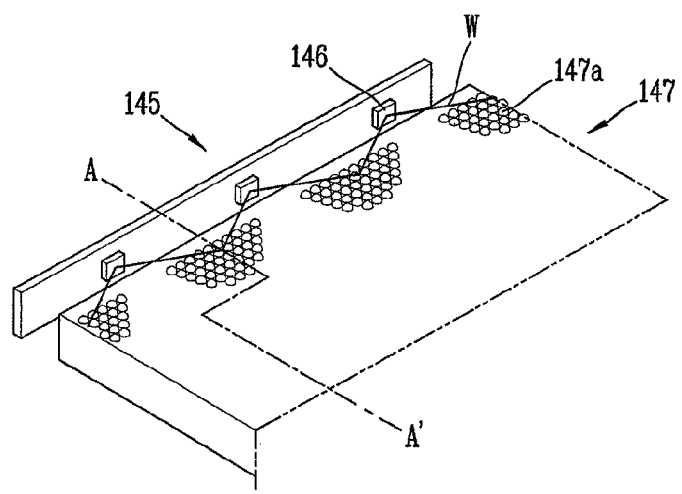
FIG. 4 is a partial sectional view showing a light guide plate and a light emitting means of FIG. 3.

FIG. 3 is an exploded perspective view showing an LCD device according to the present invention, and FIG. 4 is a partial sectional view showing a light guide plate and a light emitting means of FIG. 3.

Referring to FIGS. 3 and 4, the LCD device comprises: a main support 150 for maintaining a balance of an external force applied to an entire surface of the LCD device; an LC panel 160 disposed on the main support 150 and displaying images; and backlight units 141, 143, 145, 147, and 149 disposed below the LC panel 160, and providing light. Here, the backlight units includes a light emitting means 145 disposed at one side of a lower cover 100, and having light emitting devices 146 such as LED packages arranged in a column with a constant gap therebetween; a housing 143 for protecting the light emitting means 145 from an external impact; and a light guide plate 147 for guiding light occurring from a plurality of light emitting devices 146 provided at one side thereof, and having light scattering patterns 147a with a certain gap therebetween at an edge region on an upper surface thereof, each light scattering pattern 147a implemented as a group. Here, the light scattering pattern 147a is disposed to correspond to a region between the light emitting devices 146.

A reflection plate 141 is attached onto the lower cover 100 formed of Al, and so on. The reflection plate 141 is implemented as a film formed of white polyester, or a film onto which metallic materials such as Ag and Al are coated. Here, the reflection plate 141 has reflectivity of about 90~97% for visible rays. The reflectivity is directly proportional to a thickness of a coated film.

The light emitting means 145 is provided at one side of the lower cover 100 to which the reflection plate 141 is attached. Here, the light emitting means 145 includes light emitting devices 146 such as LED packages arranged on a printed circuit board (PCB) with a constant gap therebetween. The PCB having the light emitting devices 146 fixed thereon is coupled to a coupling groove formed at an inner wall of the housing 143.

The light guide plate 147 is provided on the lower cover 100 having the reflection plate 141 attached thereto. Here, the light scattering patterns 147a forming in a plurality of groups are formed at an edge region of an upper surface of the light guide plate 147, with a constant gap therebetween. Each of the light scattering patterns 147a forming in a plurality of groups is composed of a plurality of embossing patterns.

More concretely, the light scattering patterns 147a on the light guide plate 147 are disposed in the same direction as the light emitting means 145 provided at one or more sides of the lower cover 100. Here, the light scattering pattern 147a is disposed on an upper surface of the light guide plate 147 so as to correspond to a region between the light emitting devices 146 adjacent to each other, the light emitting device 146 provided on one side wall of the light guide plate 147 and arranged on the PCB. The light scattering pattern 147a is formed in a group composed of a plurality of embossing patterns.

The light scattering pattern 147a formed in a group has an approximate semi-circular shape or a semi-oval shape when viewed from the upper side. A plurality of the light scattering patterns 147a is formed at an edge region of an upper surface of the light guide plate 147, with a constant gap therebetween.

Here, the light scattering pattern 147a having a semi-circular shape or a semi-oval shape along a moving direction of light when viewed from the upper side is formed with a distance (d). For a 15.4 inch LED LCD device, the distance (d) is within a range of about 20~30 mm in a moving direction of light incident from the light guide plate 147.

Preferably, the light scattering patterns 147a are integrally formed with the light guide plate 147 through intaglio patterns formed on an additional metallic pattern. Here, the light guide plate 147 is formed of polymethymethacrylate (PMMA), which has very high transparency and gloss due to the smallest absorption feature for visible rays among high polymer materials. The light scattering pattern 147a is not easily broken or deformed due to its high mechanical strength, has a high durability against chemical features, and has a light weight. In addition, the light scattering pattern 147a has high transmittance for visible rays of about 90~91%, and has a very small inner loss. Furthermore, the light scattering pattern 147a has a high mechanical strength against tension, bending, and extension, and a high durability against chemical features.

An optical sheet 149 for complementing an optical characteristic of light provided through the light guide plate 147 is disposed on the light guide plate 147. Although not shown, the optical sheet 149 may include a diffusion sheet having a diffusion pattern for attenuating non-uniformity of light, and a prism sheet having a light collecting pattern for enhancing a frontal brightness of light.

The main support 150 formed of synthetic resin or SUS (steel use stainless) molding material and implemented as a rectangular frame is coupled to an upper portion of the optical sheet 149.

The LC panel 160 is disposed on the main support 150. The LC panel 160 is composed of a TFT array substrate 160a; a color filter substrate 160b facing the TFT array substrate 160a, having color filters of R, G and B, and bonding to the TFT array substrate 160a with a uniform cell gap therebetween; and an LC layer formed between the two substrates.

The upper cover 170 is disposed to cover four edges of the LC panel 160, and is coupled to the main support 150 or the lower cover 100.

Hereinafter, the principle that brightness is enhanced by the light scattering pattern of the light guide plate will be explained in brief.

Figure 5:
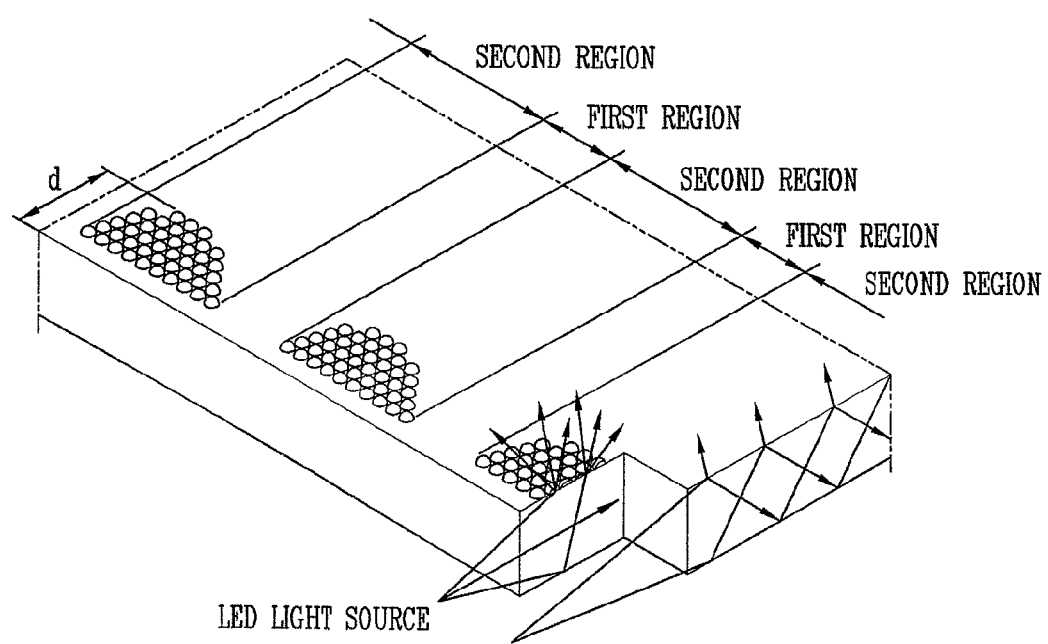
FIG. 5 is a cut perspective view taken along line "A-A" in the light guide plate of FIG. 4.

FIG. 5 is a cut perspective view taken along line "A-A" in the light guide plate of FIG. 4.

Referring to FIGS. 4 and 5, the light guide plate 147 is divided into first regions corresponding to the light emitting devices 146 of the light emitting means 145 along a moving direction of light, the light emitting means 145 provided at one edge region of the light guide plate 147; and second regions corresponding to regions, each region located between two light emitting devices 146. Here, the light emitting devices 146 emit light within a width range prescribed at the time of an initial design. When light incident onto the light guide plate 147 has an incidence angle equal to or less than a threshold angle, the light is totally reflected at an inner surface of the light guide plate 147. On the contrary, when the light incident onto the light guide plate 147 has an incidence angle equal to or more than the threshold angle, the light is partially refracted out through the light guide plate 147. Here, the threshold angle ($\alpha$) indicates an incidence angle where a total reflection starts to occur when light is incident onto a material having a small refractivity from a material having a large refractivity. The threshold angle (α) is determined by refractivity of each of two materials through which light passes.

Since on the first region most light is totally reflected, it is assumed that 30% of light is refracted from the light guide plate 147, whereas the rest 70% of light is totally reflected.

Light incident onto the second region of the light guide plate 147 through lateral sides of the light emitting devices 146 has a controlled threshold angle due to the light scattering patterns 147a formed at an edge region on an upper surface of the light guide plate 147. Accordingly, the amount of light totally-reflected along the light guide plate 147 is decreased to about 50%, whereas the amount of light passing through the light guide plate 147 through the light scattering patterns 147a is increased to about 50%.

Accordingly, the first and second regions maintain a similar brightness at the edge region of the light guide plate 147. This allows the conventional dark regions corresponding to the second regions and having a relatively lower brightness to have an enhanced brightness.

In the present invention, the light scattering patterns 147a of FIG. 3 are implemented to have embossing patterns. However, the light scattering patterns 147a may be implemented to have various shapes such as a lenticular shape or a triangular shape.

In the present invention, a hot spot phenomenon occurring at the edge region of the light guide plate is prevented, thereby enhancing appearance quality of the screen of the LCD device.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display (LCD) device, comprising:
   an LC panel;
   a light guide plate disposed below the LC panel, an upper surface having formed the flat portions and having light scattering patterns formed in a plurality of groups at one or more edge regions on the upper surface thereof; and
   light emitting devices disposed at a side wall of the light guide plate, each light emitting device disposed to correspond to a region between the light scattering patterns;
   wherein the light emitting devices includes LED packages arranged on a printed circuit board with a constant gap, and
   wherein the light scattering pattern is disposed on an upper surface of the light guide plate so as to correspond to a region between the light emitting devices adjacent to each other;
   wherein the light scattering patterns include embossing patterns,
   wherein a distance of the light scattering pattern is within a range of 20~30mm in a moving direction of light incident from the light guide plate's edge.

2. The LCD device of claim 1, wherein the light scattering patterns formed in a plurality of groups have a semi-circular shape or a semi-oval shape when viewed from an upper side.

3. The LCD device of claim 1, wherein the light scattering patterns are formed of the same material as the light guide plate.

* * * * *